(12) United States Patent
Gailloux et al.

(10) Patent No.: US 8,014,733 B1
(45) Date of Patent: Sep. 6, 2011

(54) WEARABLE SYSTEM FOR ENABLING MOBILE COMMUNICATIONS

(75) Inventors: Michael A. Gailloux, Overland Park, KS (US); Michael W. Kanemoto, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 1085 days.

(21) Appl. No.: 11/627,623

(22) Filed: Jan. 26, 2007

(51) Int. Cl.
*H04B 1/38* (2006.01)
(52) U.S. Cl. .................................... 455/90.3
(58) Field of Classification Search ............... 455/90.2
See application file for complete search history.

(56) References Cited

U.S. PATENT DOCUMENTS

| | | | | |
|---|---|---|---|---|
| 6,032,530 | A * | 3/2000 | Hock | 73/379.01 |
| 6,157,898 | A * | 12/2000 | Marinelli | 702/141 |
| 6,516,284 | B2 * | 2/2003 | Flentov et al. | 702/142 |
| 6,825,777 | B2 | 11/2004 | Vock et al. | |
| 7,024,228 | B2 * | 4/2006 | Komsi et al. | 455/566 |
| 7,061,399 | B2 * | 6/2006 | Leck | 340/870.06 |
| 7,187,299 | B2 * | 3/2007 | Kunerth et al. | 340/870.05 |
| 7,225,565 | B2 * | 6/2007 | DiBenedetto et al. | 36/132 |
| 7,373,820 | B1 * | 5/2008 | James | 73/488 |
| 7,386,401 | B2 * | 6/2008 | Vock et al. | 702/44 |
| 7,386,863 | B2 * | 6/2008 | Bodin et al. | 719/321 |
| 7,451,056 | B2 * | 11/2008 | Flentov et al. | 702/141 |
| 7,509,099 | B2 * | 3/2009 | Kayzar et al. | 455/90.3 |
| 7,512,515 | B2 * | 3/2009 | Vock et al. | 702/141 |
| 7,684,755 | B2 * | 3/2010 | Pierce et al. | 455/41.2 |
| 2003/0126593 | A1 * | 7/2003 | Mault | 725/10 |
| 2004/0132461 | A1 * | 7/2004 | Duncan | 455/456.1 |
| 2005/0165914 | A1 * | 7/2005 | Moore et al. | 709/219 |
| 2005/0219223 | A1 * | 10/2005 | Kotzin et al. | 345/173 |
| 2006/0121924 | A1 * | 6/2006 | Rengaraju et al. | 455/518 |
| 2006/0121925 | A1 * | 6/2006 | Jung | 455/518 |
| 2006/0211383 | A1 * | 9/2006 | Schwenke et al. | 455/90.2 |
| 2006/0223459 | A1 * | 10/2006 | Maggenti | 455/90.2 |
| 2006/0252441 | A1 * | 11/2006 | Harris et al. | 455/518 |
| 2007/0123285 | A1 * | 5/2007 | Baudino et al. | 455/518 |
| 2007/0178875 | A1 * | 8/2007 | Rao et al. | 455/343.1 |
| 2007/0184868 | A1 * | 8/2007 | Allen et al. | 455/518 |
| 2007/0197249 | A1 * | 8/2007 | Ross et al. | 455/518 |
| 2007/0197250 | A1 * | 8/2007 | Kies et al. | 455/518 |
| 2007/0219430 | A1 * | 9/2007 | Moore | 600/300 |
| 2007/0232242 | A1 * | 10/2007 | Dunko | 455/90.2 |
| 2007/0243835 | A1 * | 10/2007 | Zhu et al. | 455/90.2 |
| 2007/0298751 | A1 * | 12/2007 | Wulff | 455/343.1 |
| 2008/0026700 | A1 * | 1/2008 | Smith | 455/90.2 |
| 2008/0075055 | A1 * | 3/2008 | Chow et al. | 370/338 |

OTHER PUBLICATIONS

Newton. Newton's Telecom Dictionary. pp. 823 and 886. 2007 New York, NY. Mar. 2007.

* cited by examiner

*Primary Examiner* — Yuwen Pan

(57) ABSTRACT

A system and associated methods are disclosed for facilitating mobile communications. In one embodiment, the system increases the utility of mobile communications devices by integrating communications electronics into wearable items, so that communications sessions are more easily conducted in a variety of circumstances. Further, in additional embodiments, the methods enable movement performance for an individual to be monitored and reported by an associated mobile communications device, and for preselected messages to be transmitted to inquiring devices depending on sensed movement activity.

17 Claims, 4 Drawing Sheets

WEARABLE SYSTEM FOR ENABLING MOBILE COMMUNICATIONS

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND

A variety of systems have been developed over time for enabling mobile communications. Two-way radios, "walkie talkies", and the like, were the first widespread wireless devices that allowed individuals located remote from one another to share voice communications. Each user tunes their device to a dedicated frequency, where half-duplex transmissions are shared. Prior to the development of cellular networks, communication via two-way radios was limited by the strength of the transmission signal from the device and the particular frequency used, among other factors. Cellular networks have been able to overcome these obstacles by employing a set of distributed stations, each having a transmitter. As the user's radio device moves between coverage areas of adjacent stations, transmissions from and to the radio device are handled by the transmitter/receiver of the closest distributed station. In the case of a cellular telephone network, the distributed station or "base station" is connected with a telephone network switch so that both half-duplex and full-duplex transmissions from a mobile cellular telephone may be carried across the telephone network backbone.

With the advances made in mobile communications technology, users are now demanding more robust features for their wireless devices. For instance, there is a desire to facilitate voice communications among a group of individuals who are engaged in certain sporting activities. While modern mobile telephones and telephone network-based radio devices are typically small enough for the user to carry or place in their pocket, there can difficulty in initiating a communications transmission depending on the current activity of the user (e.g., a skier or snowboarder in motion) and the gear worn by the individual (e.g., an insulated coat and gloves). This can have a detrimental effect on the spontaneity of a communications session, as the user often has to remove some of their gear or otherwise break from their current activity in order to access their communications device. Furthermore, if the user does not realize a transmission from another user has been received on their device, or is not in a position to "answer" the communication, the requesting user is only left to speculate as to why the non-answering user is not available for a communications session. Thus, there is a desire to provide requesting users with additional information as to why a particular user being requested for a communications session is unavailable. Furthermore, there is a desire to monitor the movement performance of an individual engaged in a sporting activity and share such performance data with others.

BRIEF SUMMARY

The system and methods embodied herein facilitate mobile communications for individuals. In particular, the system increases the utility of mobile communications devices by integrating communications electronics into wearable items, so that communications sessions are more easily conducted in a variety of circumstances. Further, the methods enable movement performance for an individual to be monitored and reported by an associated mobile communications device, and for preselected messages to be transmitted to inquiring devices depending on sensed movement activity.

In one aspect, a wearable communications enabling device includes components integrated with an article of clothing, including a push-to-talk switch. Specifically, the article of clothing has a containment portion for receiving a mobile communications device, and a wiring arrangement extending from the push-to-talk switch to the containment portion. The push-to-talk switch becomes electrically coupled with the mobile communications device via the wiring arrangement, enabling the user to initiate voice transmissions from their mobile communications device without having to access the mobile device in the containment portion. Furthermore, in an embodiment, one or more speakers and a microphone are integrated with the article of clothing and are electrically coupled with the wiring arrangement. In this way, when the mobile device is stored in the containment portion of the clothing article, the user realizes increased audio fidelity in their communication session as compared to utilizing the speaker and microphone devices on the stored device itself.

In another aspect, movement performance monitoring is facilitated. According to one method, movement sensing data originating with a remote sensing device is received by a mobile telecommunications device. The remote device is coupled to a sport implement experiencing the movement that is sensed, and utilizes a wireless communications protocol to communicate with the mobile telecommunications device when the remote device is associated with the personal area network of the mobile telecommunications device. Thereafter, the moving sensing data may be presented on the display of the mobile telecommunications device or transmitted from the mobile telecommunications device to a network location. Such a network location may be a centralized database that other authorized users may access, and such moving sensing data may be transmitted to other users who are also engaged in an activity where movement performance monitoring is taking place. Further, a system facilitates movement performance monitoring through the use of the wearable communications enabling device coupled with the remote sensing device. In such a system, the remote sensing device may be coupled with a sport implement, or otherwise positioned relative to the wearable communications enabling device and within a common local area network.

In another aspect, a method is provided for communicating an availability condition for a first mobile communications device user to another inquiring second mobile communications device user. According to the method, a first mobile communications device receives a push-to-talk communication transmission from a second mobile communications device. The first mobile communications device registers movement activities sensed by a remote device associated with the personal area network of the first mobile communications device. A wireless communications protocol is utilized by the remote device to communicate the sensed data to the first mobile communications device. If the movement activities are of a specific type, the first mobile device generates and transmits a preselected message to the second mobile communications device indicating that the first user is not available for a communications session. For instance, if a certain amount of accelerations are measured by the remote sensing device, the preselected message sent to the inquiring second mobile communications device user may indicate that the first user is engaged in sporting activity and cannot reply at this time.

Additional advantages and features of the invention will be set forth in part in a description which follows, and in part will become apparent to those skilled in the art upon examination of the following, or may be learned by practice of the invention.

BRIEF DESCRIPTION OF THE SEVERAL VIEWS OF THE DRAWING

The present invention is described in detail below with reference to the attached drawing figures, wherein.

DETAILED DESCRIPTION

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different components of methods employed, the terms should not be interpreted as implying any particular order among or between various steps herein disclosed unless and except when the order of individual steps is explicitly described.

Figure 1:
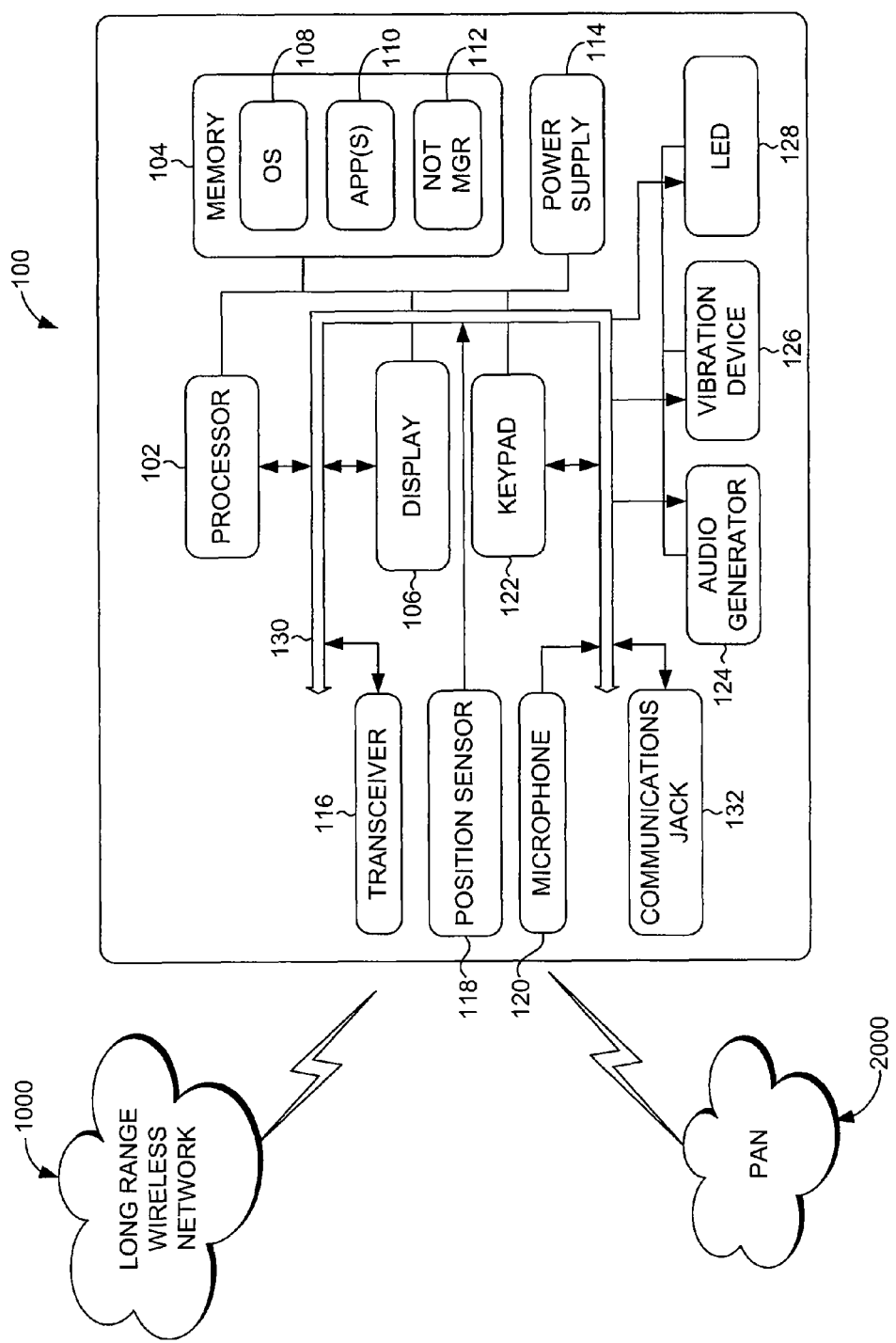
FIG. 1 is a schematic view of an exemplary mobile communications device and network environment suitable for use in implementing the present invention.

Turning to FIG. 1, an exemplary mobile communications device 100 is illustrated. The mobile communications device 100 operates on both a long range wireless network 1000 (such as a cellular telephone network) and within a personal area network (PAN) 2000. As one example, communications within the PAN 2000 are conducted by a wireless communications protocol, such as by Bluetooth® format. However, it should be appreciated that other radio-frequency formats may be selected. Optionally, the mobile device 100 may forgo operating on the long range wireless network 1000 and simply engage in public frequency radio transmissions, such that the mobile device 100 is configured to have a robust signal strength for communicating with other devices across a larger geographic region than the PAN 2000. The mobile device 100 may primarily perform the function of a traditional wireless communications device (e.g., a mobile cellular phone) or may also function as a general or special purpose computing device, such as a personal digital assistant (PDA) or any other type of electronic device.

One suitable arrangement for a set of functional components of the mobile communications device 100 is provided in FIG. 1, though it is contemplated that other functional components not shown may be included in the mobile device 100 dependent on the operational aspects of and features provided by the device 100. Additionally, less than all of the functional components may be needed in the mobile communications device 100 if certain functionalities are not desired. Included in the mobile communications device 100 are a processor 102, a memory 104, a display 106, and certain input/output means. The memory 104 generally includes both volatile memory (e.g., RAM) and non-volatile (e.g., ROM, memory cards, etc.). In one embodiment, an operating system 108 is resident in the memory 104 and executes on the processor 102. One or more application programs 110 are loaded into the memory 104 and run on the operating system 108. A notification manager 112, for handling notification requests from the applications 110, may also be loaded into the memory 104 for execution on the processor 102. The processor 102 may alternatively be in the form of an application specific integrated circuit (ASIC), e.g., for mobile cellular phone communications, so that applications 110 reside on the processor 102. The mobile communications device 100 also has a power supply 114 which may be implemented as one or more internal batteries and/or as an external power source, such as through an AC adapter, a powered docking cradle, or an external battery.

Input and output for the mobile communications device 100 is made through various components. A transceiver 116 (acting as a receiver), a position sensor 118 (e.g., a GPS sensor for geolocation of the device 100), a microphone 120 and a keypad 122 receive input, with an audio generator 124 (e.g., a speaker), a vibration device 126, one or more LEDs 128, as well as the display 106 and the transceiver 116 (acting as a transmitter) generating or handling output, each component being coupled with a bus 130 for communication with the processor 102 and other components (e.g., memory 104) and for receiving power from power supply 114. The transceiver 116 transmits and receives signals for communication with the long range wireless network 1000 components (a cellular base station, a satellite, etc.), another robust radio transceiver (e.g., for public frequency radio transmissions), and with PAN 2000 associated devices. One particular PAN 2000 associated device is a remote sensing device, as explained in further detail below with respect to FIGS. 2 and 5.

Figure 2:
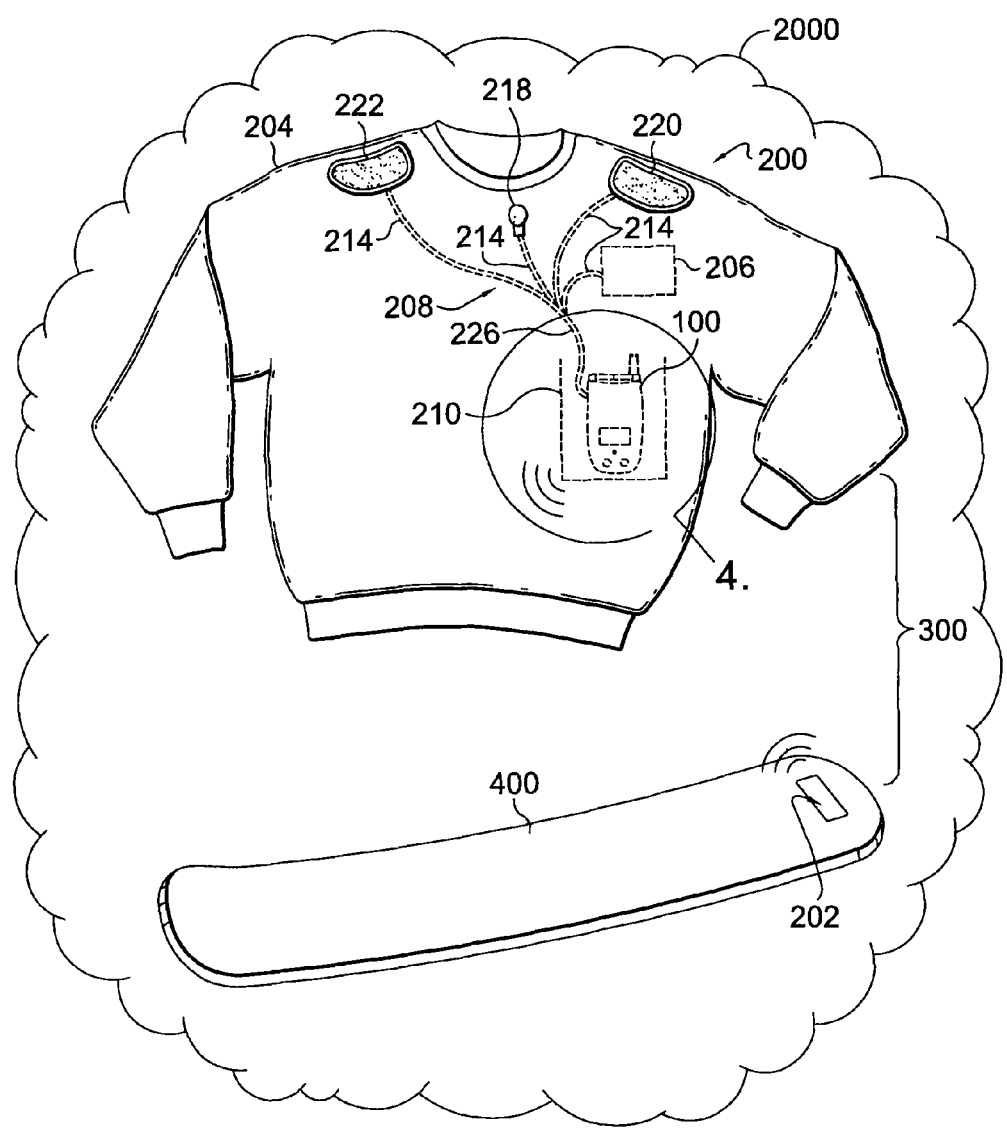
FIG. 2 is a pictorial view of a wearable communications enabling device coupling with a remote sensing device for supporting performance monitoring.

With further reference to FIG. 2, and continuing reference to FIG. 1, a wearable communications enabling device 200 and associated remote sensing device 202 are depicted. The wearable device 200 utilizes the conventional mobile communications device 100 for both communicating in a push-to-talk type fashion and for displaying and/or relaying information regarding movement performance data generated by the remote sensing device 202 located within the PAN 2000 common to the mobile device 100 and the sensing device 202.

Figure 3:
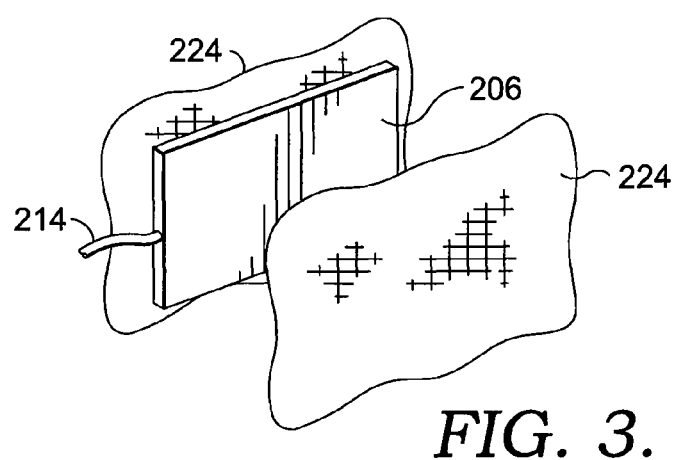
FIG. 3 is an exploded view of a portion of the wearable communications enabling device showing a push-to-talk switch integrated with an article of clothing.
Figure 4:
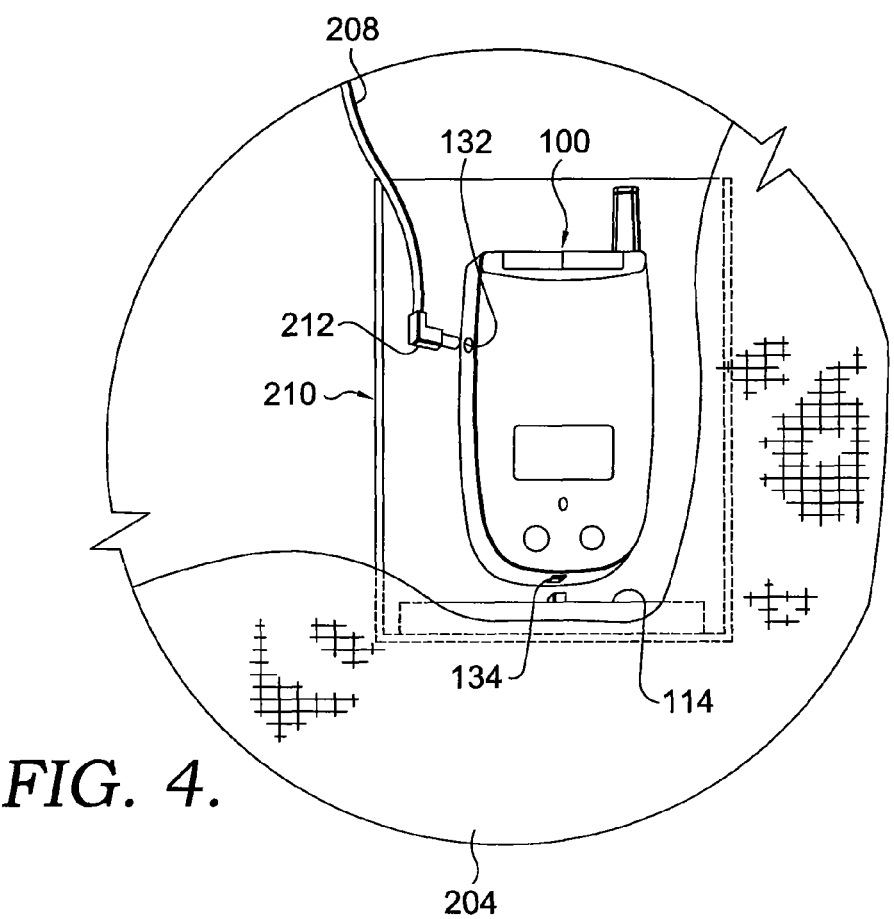
FIG. 4 is a partial sectional view generally in the region identified by the numeral 4 in FIG. 2, showing a wiring arrangement and interfacing plug for coupling together the push-to-talk switch with a mobile communications device held within a containment portion of the wearable communications enabling device.

The wearable device 200, as seen in FIGS. 2-4, is formed by a wearable article 204, such as a clothing item (e.g., a jacket) or other wearable item (e.g., a backpack), a push-to-talk switch 206 integrated with the article 204, and a wiring arrangement 208 extending from a containment portion 210 of the article 204 to the push-to-talk switch 206. Further, the wiring arrangement 208 has a first terminal end 212 formed as a plug or other multi-conductor protrusion for mating with a receptacle 132 formed as a communications jack of the mobile communications device 100. Distal to the plug 212, the wiring arrangement 208 branches into individual conductive wires 214. Each of the conductive wires 214 provides a conductive pathway (via the first terminal end 212) to one of the conductive contacts of the communications jack 132 of the mobile device 100. Specifically, one of the conductive wires 214 extends to each of a microphone 218, a left channel speaker 220, a right channel speaker 222, and the push-to-talk switch 206, enabling signal transmission to the communications jack 132 of the mobile device 100. Thus, the user can initiate a voice transmission by traditional half-duplex communication methods on the mobile device 100 by engaging the push-to-talk switch 206, with audio input captured by the microphone 218 and converted to sound data for handling by the mobile device 100. In the case of the wearable article 204 being a clothing item, the push-to-talk switch 206 may be located on the chest or sleeve of the item, as examples, so that the switch is easy to reach. Physically impacting the push-to-talk switch 206 begins the particular voice transmission through the mobile device 100 coupled with the wiring arrangement plug 212, and a subsequent impact on the switch 206 ends the particular voice transmission. Upon ending the transmission, the mobile device 100 sends any voice communication received from other mobile devices as sound data through the appropriate conductive wire 214 to the speakers 220 and 222 for audio output. The wiring arrangement 208 also allows the microphone 218 and speakers 220 and 222 to function in a full-duplex operational mode without the push-to-talk switch 206, for traditional cellular phone calling activity where a call is made to a dedicated telephone number with the mobile device 100. It should be understood that other methodologies may be implemented in activating the push-to-talk switch 206 to mimic the depression of a push-to-talk button on a conventional mobile communications device (e.g., depression of the switch 206 for a certain period of time, or a certain number of consecutive times, to begin or end a discrete voice transmission).

With reference to FIG. 3, one particular assembly arrangement for integrating the push-to-talk switch 206 with the wearable article 204 is depicted. The push-to-talk switch 206 may be sandwiched between material layers 224 of the article 204, and the layers 224 sewn or otherwise attached together to cover the switch 206 and maintain the generally fixed position of the switch 206 on the article 204. This structure provides protection for the push-to-talk switch 206 from the outside environment. The push-to-talk switch 206 is formed as a pressure or touch sensitive switch, and preferably has the capability of being calibrated depending on the type of wearable article 204 with which the switch 206 is integrated and material layers that are surrounding the switch 206, to control the sensitivity of the switch 206 to touch. In a similar fabrication method, the microphone 218 and left and right channel speakers 220 and 222 may be sewn to a fabric layer or between overlapping fabric layers of the wearable article 204. Alternatively, the microphone 218 and speakers 220 and 222 may be adhered or otherwise attached with the article 204 by any known method. In the case of the article being a backpack or similar item, the push-to-talk switch 206, the microphone 218 and the speakers 220 and 222 may be located on or within the shoulder straps of the backpack, or any other location thereon.

As seen in FIG. 4, the containment portion 210 of the wearable article 204 provides a generally secure location for holding the mobile communication device 100 while utilizing the capabilities of the wearable device 200. The containment portion 210 may be formed as an internal pocket of the article 204, with a channel 226 extending from the pocket through which the wiring arrangement 208 is threaded to reach the push-to-talk switch 206, the microphone 218 and the speakers 220 and 222. Such a channel 226 also locates the wiring arrangement plug 212 for ease of connection with the communications jack 132 of the mobile device 100. Optionally, an external battery functioning as power supply 114 may be located within the containment portion 210, for connecting with another receptacle 134 of the mobile device 100. Although the containment portion 210 is shown as a pocket-type structure, the portion 210 may take any structural form for holding a mobile device 100, such as an elastic strap as one example.

An understanding of how the wearable communications enabling device 200 and associated remote sensing device 202 interact will now be explained with particular reference to FIGS. 2 and 5. Devices 200 and 202 combine to form a mobile system 300 for supporting performance monitoring when the sensing device 202 is located within the PAN 2000 common to the mobile communication device 100 and the sensing device 202. The remote sensing device 202 may be coupled with a sport implement 400 for performance monitoring, or located with any object utilized or otherwise secured to the user associated with the wearable device 200. As examples, the sport implement may be a snow board (as depicted in FIG. 2), water or snow ski, a bicycle, or any other type of sporting gear or tool.

Figure 5:
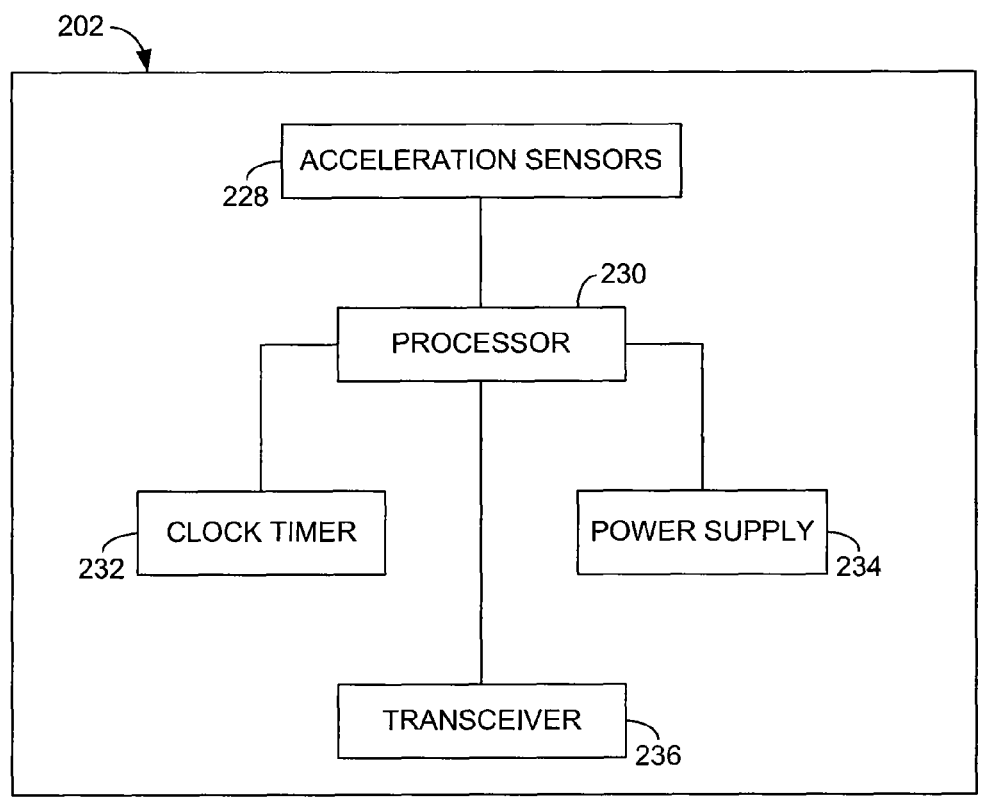
FIG. 5 is a schematic view of the remote sensing device.

A set of functional components of the remote sensing device 202 are shown in particular in FIG. 5. The sensing device 202 utilizes acceleration sensors 228, or accelerometers to determine when movement of the user, specifically, the sport implement 400 or similar object, is taking place. The acceleration sensors 228 may measure linear accelerations in three dimensions, as well as rotational accelerations for pitch, roll and yaw. The sensors 228 may also measure less than three degrees of both linear and rotational acceleration. Signals generated by the sensors 228 are processed by a processor 230 to create movement data. The processor preferably takes the form of an ASIC processor with memory and applications residing on the processor 230. A clock timer 232 is coupled with the processor 230. The clock timer 232 facilitates integration of the acceleration signals over time by the processor 230 to determine velocities in associated linear and rotational directions. Additionally, the clock timer 232 enables periodic acceleration measurements and movement data transmission by the sensing device 202 to the mobile communication device 100 in order to conserve power and for the purpose of determining an availability condition for a communication session by the user of the mobile system 300. The sensing device 202 also includes a power supply 234 in the form of one or more batteries or similar functional items, and a transceiver 236 for transmitting the movement data and receiving a polling signal from the mobile device 100 requesting that a performance monitoring session commence. Alternatively, the transceiver 236 may simply provide transmission capabilities (without a receiver) to send the movement data across the PAN 2000 to the associated mobile device 100.

In use, the user places their mobile communication device 100 within the containment portion 210 of the wearable article 204 and secures the plug 212 of the wiring arrangement 208 with the communications jack 134 of the mobile device 100. The user also makes a request on the mobile device 100 to find any communication devices within the PAN 2000 of the device 100, such as by a Bluetooth® radio-frequency format transmission. Such a PAN request is a conventional step, as known to those of skill in the art. Upon the mobile device 100 recognizing the remote sensing device 202, the user can being various movement or sporting activities. Based on the sensed movements, the sensing device 202 measures and transmits the movement data to the mobile device 100. At the mobile device 100, the movement data may be presented on the display 106 of the device 100, such as in the form of acceleration or velocity values. Additionally, the movement data may be transmitted by the mobile device 100 across the long range wireless network 1000 to other mobile device 100 users, such as in the form of a text message identifying the particular mobile device 100 user and their movement or performance data. The particular user engaged in a performance activity can create on their mobile device 100 a preselected list of identifying addresses (e.g., phone numbers or email addresses) to which the movement data is automatically transmitted after it is received by the mobile device 100 from the sensing device 202. Still further, such transmitted data may be routed to a central location on the network 1000, such as a database, where it may be accessed by authorized users to learn the performance characteristics of various mobile system 300 users. In one embodiment, the database may be an Internet-accessible database.

Another method of use of the mobile system 300 is to provide an availability condition for a user of the mobile system 300 and to communication such an availability condition to another mobile system 300 user, or merely to any user of a mobile communication device having push-to-talk communications capability. Upon the mobile communications device 100 receiving a push-to-talk transmission from another mobile communications device, the device 100 either polls the sensing device 202 for movement data or check for recent transmissions of movement data received by the device 100 and stored in memory. Depending on the type of activity represented by the movement data, the mobile device 100 may generate a "non-available" message for transmission to the inquiring mobile communications device. For instance, if the sensing device 202 is measuring rapid changes in acceleration of a significant amplitude, this may indicate that the mobile system 300 user is engaged in strenuous sporting activities and would likely not be available to engage in a communication session by transmitting a reply signal (e.g., push-to-talk transmission or a specific telephone network call) back to the inquiring mobile communications device. The mobile device 100 user can create a preestablished message that is automatically transmitted along the dedicated push-to-talk frequency upon the device 100 receiving the inquiring mobile communications device user's push-to-talk transmission and the requirements for the "non-available" condition being met. Additionally, when the "non-available" condition is met, the mobile device 100 may disengage signal transmission and reception through the communications jack 134 to the components of the wearable communications enabling device 200, so that the mobile system 300 user is not distracted by hearing the push-to-talk transmission through the speakers 220 and 222. Alternatively, the mobile device 100 may transmit the preestablished "non-available" message without disengaging any wearable device 200 components. On the other hand, if the sensing device 202 is currently measuring or has most recently measured less severe accelerations in terms of frequency or amplitude, the mobile device 100 receiving the movement data avoids the step of generating and transmitting the "non-available" message, allowing unencumbered push-to-talk communications to take place. It should also be understood that process of determining whether the movement data represents sensed activity sufficient enough for the "non-available" condition to be valid may be performed by the sensing device 202 itself in one embodiment, and by the mobile device 100 in an alternative embodiment. In the case of the sensing device 202 handing the determination of availability for a communications session, the associated processor 230 is preprogrammed to monitor the signals generated by the acceleration sensors 228 to determine if such signals are outside of an acceptable range of amplitude, frequency, or other relevant characteristic, and if so, transmit to the mobile device 100 the indication of the "non-available" condition along with the movement data. Alternatively, the sensing device 202 may merely pass on to the mobile device 100 the movement data as processed form the acceleration sensor signals. In such a case, the processor 102 of the mobile device is itself responsible for the determination of whether the movement data includes acceleration or velocity values (or changes therein) that are outside of an acceptable range, and thus determining the "non-available" condition. No matter the process for determining the "non-available" condition, new push-to-talk transmissions received by the mobile system 300 will again cause the system 300 to make a determination of the availability of the system 300 user for a communication session. However, the mobile system 300 may be configured such that the validity of the "non-available" condition is only examined over a preset timeframe (e.g., every few seconds, each minute, etc.), and not instantaneously for each new push-to-talk transmission received. As an example, if a snowboarder utilizing the mobile system 300 takes a break from strenuous movement activities on a snow slope, they may not want to be available for a conversation if such a break is only for a few seconds. The snowboarder may find the voice transmissions received in such a situation to be distracting to their sporting activity. However, if the snowboarder is stationary or otherwise sensed to be moving slowly or infrequently for some time, the preset timeframe will pass and the "non-available" condition can be reexamined to determine availability for the mobile system 300 to communicate.

From the foregoing, it can be seen that various embodiments of the system and methods of the present invention facilitate mobile communications for individuals, and further provide for movement performance monitoring and reporting by an associated mobile communications device. The aforementioned system and methods have been described in relation to particular embodiments, which are intended in all respects to be illustrative rather than restrictive. Since certain changes may be made in the aforementioned system and methods without departing from the scope hereof, it is intended that all matter contained in the above description or shown in the accompanying drawing be interpreted as illustrative and not in a limiting sense.

What is claimed is:

1. A wearable communications enabling device comprising:
   an article configured for wearing by a user, and having a containment portion for receiving a mobile communications device;
   a push-to-talk switch for initiating and ending a voice transmission on the mobile communications device, the push-to-talk switch integrated with the article;
   a wiring arrangement extending from the push-to-talk switch to the containment portion of the article for selectively electrically coupling the push-to-talk switch with the mobile communications device when such mobile communications device is located within the containment portion; and
   a remote sensing device for monitoring and recording movement sensing data and transmitting the movement sensing data to the mobile communications device, wherein a transmitted message of the user's unavailability is invoked when the movement sensing data exceeds a preset timeframe and a level of sufficient activity.

2. The device of claim 1, wherein the containment portion of the article configured for wearing is formed as a pocket.

3. The device of claim 1, further comprising:
one or more speakers and a microphone integrated with the article configured for wearing and electrically coupled with the wiring arrangement for communicating sound data from the microphone to the mobile communications device and communicating sound data from the mobile communications device to the speakers.

4. The device of claim 1, wherein the wiring arrangement is a terminal end plug configured for mating with a jack of the mobile communications device.

5. The device of claim 1, wherein the push-to-talk switch is sandwiched between material layers of the article configured for wearing.

6. The device of claim 1, wherein the article configured for wearing by a user comprises a clothing item.

7. The wearable communications enabling device of claim 1, wherein the user's unavailability is reexamined when the movement sensing data is determined to be stationary, moving slowly, or moving infrequently.

8. The wearable communications enabling device of claim 1, wherein the remote sensing device comprises a processor to determine the user's unavailability from the movement sensing data.

9. The wearable communications enabling device of claim 1, wherein the mobile communications device comprises a processor to determine the user's unavailability from the movement sensing data.

10. A mobile system for supporting performance monitoring, comprising:
an article configured for wearing by a user, and having a containment portion for receiving a mobile communications device;
a push-to-talk switch integrated with the article;
a wiring arrangement extending from the push-to-talk switch to the containment portion of the article for selectively electrically coupling the push-to-talk switch with the mobile communications device when such mobile communications device is located within the containment portion; and
a remote sensing device configured to utilize a wireless communications protocol for communications with the mobile communications device within a common local area network, the remote sensing device measuring movement activities and invoking a transmitted message from the mobile communications device of the user's unavailability due to said movement activities when the movement activities exceed a preset timeframe.

11. The mobile system of claim 10, wherein the containment portion of the article configured for wearing is formed as a pocket.

12. The mobile system of claim 10, further comprising:
one or more speakers and a microphone integrated with the article configured for wearing and electrically coupled with the wiring arrangement for communicating sound data from the microphone to the mobile communications device and communicating sound data from the mobile communications device to the speakers.

13. The mobile system of claim 10, wherein the wiring arrangement has a terminal end plug configured for mating with a jack of the mobile communications device.

14. The mobile system of claim 10, wherein the push-to-talk switch is sandwiched between material layers of the article configured for wearing.

15. The mobile system of claim 10, wherein the user's unavailability is reexamined when the movement activities are determined to be stationary, moving slowly, or moving infrequently.

16. The mobile system of claim 10, wherein the remote sensing device comprises a processor to determine the user's unavailability from the movement activities.

17. The mobile system of claim 10, wherein the mobile communications device comprises a processor to determine the user's unavailability from the movement activities.

* * * * *